Dec. 30, 1952 N. F. MOODY ET AL 2,623,929

ALTERNATING CURRENT IMPEDANCE BRIDGE

Filed Nov. 13, 1947 3 Sheets-Sheet 1

INVENTORS
NORMAN FRANK MOODY
DONALD MURDO MCCALLUM

ATTORNEYS

Dec. 30, 1952 N. F. MOODY ET AL 2,623,929

ALTERNATING CURRENT IMPEDANCE BRIDGE

Filed Nov. 13, 1947 3 Sheets-Sheet 2

INVENTORS
NORMAN FRANK MOODY
DONALD MURDO McCALLUM
R. P. Morris
ATTORNEYS

Dec. 30, 1952 N. F. MOODY ET AL 2,623,929

ALTERNATING CURRENT IMPEDANCE BRIDGE

Filed Nov. 13, 1947 3 Sheets-Sheet 3

INVENTORS
NORMAN FRANK MOODY
DONALD MURDO MC CALLUM
RPMorris
ATTORNEYS

Patented Dec. 30, 1952 2,623,929

UNITED STATES PATENT OFFICE 2,623,929

ALTERNATING CURRENT IMPEDANCE BRIDGE

Norman Frank Moody and Donald Murdo McCallum, London, England, assignors to International Standard Electric Corporation, New York, N. Y.

Application November 13, 1947, Serial No. 785,644
In Great Britain November 15, 1946

16 Claims. (Cl. 175—183)

The present invention relates to ratio arms for alternating current impedance bridges, and concerns particularly though not exclusively, bridges intended for automatic balancing.

In automatic impedance bridges, it is required that when the unknown impedance is connected to the test terminals, the balancing standards will be adjusted by electric motors, or the like, controlled by the unbalance current or voltage of the bridge, until such current or voltage is reduced substantially to zero. A further requirement, which is also sometimes necessary, and which may also apply to bridges which are not automatically balanced, is that an appreciable error shall not be introduced by unwanted impedances which effectively connect the terminals of the unknown impedance to ground.

These requirements are difficult to satisfy, and in particular, variable reactance standards may be extremely inconvenient to adapt for automatic adjustment over wide ranges of values.

It is the principal object of the invention, therefore, to provide a convenient arrangement in which the satisfying of the above requirements is simplified. This object is achieved according to the invention by providing a ratio-arm assembly for the bridge which comprises two impedances connected in series, and an amplifier, one of the said impedances being connected in a feed-back path associated with the amplifier.

In this specification, the term "ratio-arm assembly" means the assembly of elements which constitute any pair of adjacent arms of the bridge.

The invention will be described with reference to the accompanying drawings, in which.

Figures 4, 4A:
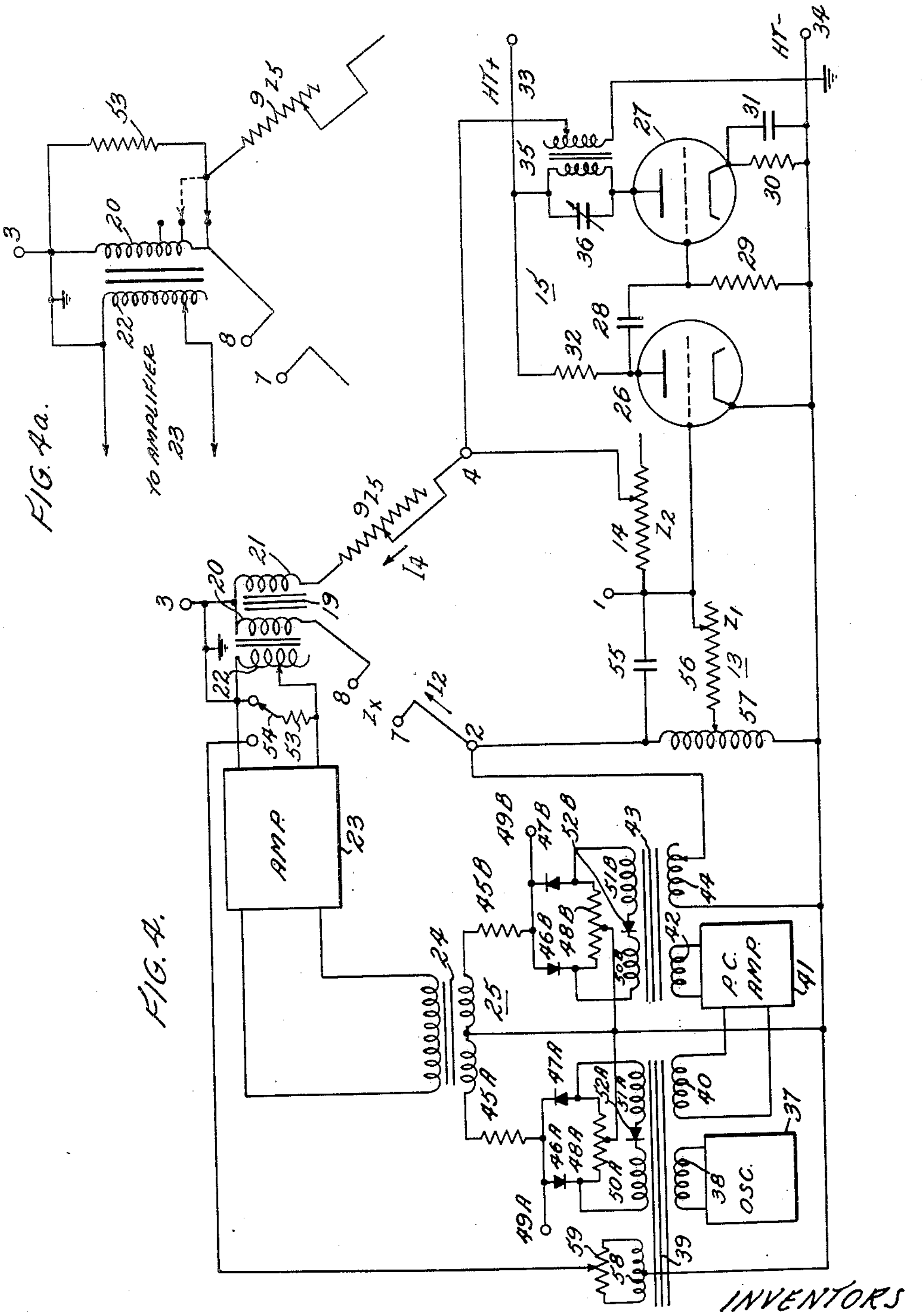
Fig. 4 shows a schematic circuit diagram of a practical form of an impedance bridge according to the invention, intended for automatic balancing.
Figure 5:
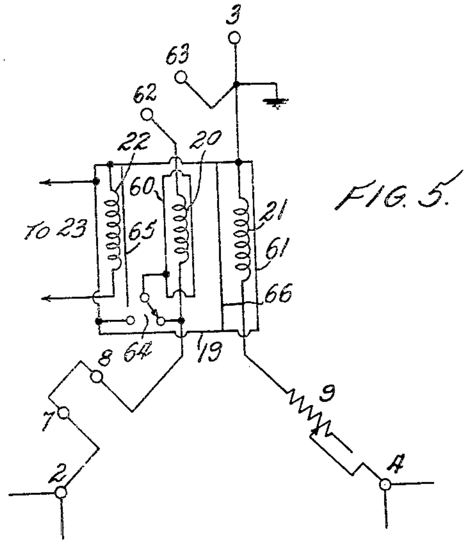

Figs. 4*a* and 5 show modifications of part of Fig. 4; and

Figure 6:
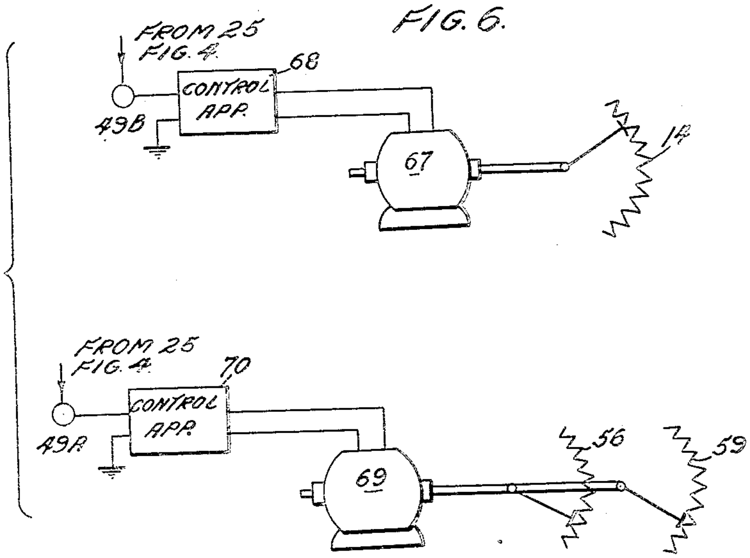

Fig. 6 shows a block schematic diagram illustrating the manner in which the automatic balancing is effected.

Figure 1:
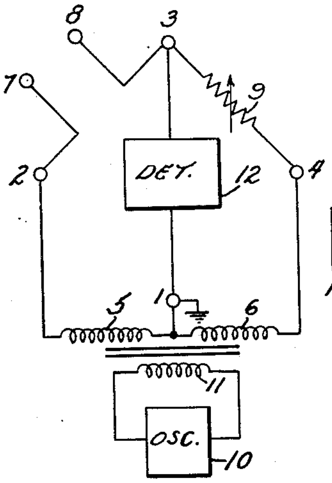
Figs. 1 and 2 show schematic circuit diagrams of two forms of a well known impedance bridge network employing closely coupled inductive ratio-arms.

It is well known that the ratio arms of an impedance bridge may with advantage take the form of a pair of closely coupled inductance coils. One such arrangement, is shown in Fig. 1. The four corners of the bridge are designated 1, 2, 3 and 4. The ratio arms comprise the two closely coupled inductance coils 5 and 6 connecting the corners 1 and 2 and 1 and 4 respectively. The unknown impedance is intended to be connected to terminals 7 and 8, and a balancing impedance 9, which will usually be variable, is connected between corners 3 and 4. An oscillator 10 or other source of alternating current is connected to a third winding 11 closely coupled to the inductances 5 and 6. A detector 12 is connected between the corners 1 and 3.

The inductances 5 and 6 will usually be equal and carefully balanced, and will be wound and connected so that for currents flowing through the coils from corner 2 to corner 4 or vice-versa, the fluxes in the core are in the same direction for both windings. Then the oscillator 10 will apply to terminals 2 and 4 equal and opposite voltages with respect to terminal 1. The inductances 5 and 6 may also be chosen to be in some integral ratio, in which case the voltages applied to terminals 2 and 4 will be in a corresponding ratio, and opposite in sign.

In operating the bridge, the impedance 9, which will generally have two variable portions corresponding respectively to resistance and reactance components, or something equivalent, will be adjusted until the detector indicates that the potentials of the corners 1 and 3 are equal.

It is well known that the pair of closely coupled inductance coils 5 and 6 behave in such a manner that the ratio of the voltages applied to corners 2 and 4 is substantially unalterable; in other words, if for any reason the voltage produced by winding 5 should be changed, the change is reflected through to the other winding 6 and the voltage produced thereby is altered so that the ratio remains the same. The importance of this is that if, for example, the corner 1 of the bridge is connected to ground, then impedances of any character may be connected from terminals 2 and/or 4 to ground without affecting the accuracy of the balance, though they will generally affect the sensitivity. Likewise a ground impedance to corner 3 simply shunts the detector and does not affect the balance. Thus the unknown direct impedance connected between the terminals 7 and 8 will be accurately measured irrespective of any admittances there may be between these terminals and ground. This is a useful feature when the bridge is used for checking components mounted in apparatus, since the amount of disconnecting necessary before the test can be made may often thereby be reduced.

Figure 2:
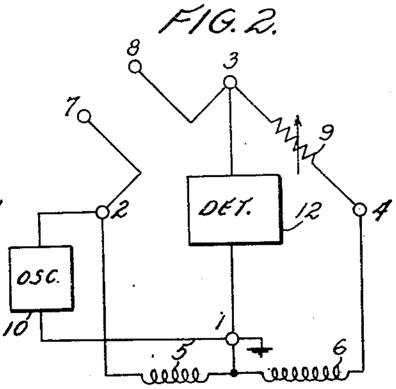

Fig. 2 is a modified form of Fig. 1, but is electrically equivalent in all material respects. In this case, the winding 11 is omitted, and the oscillator 10 is connected across the inductance 5.

While the inductive ratio arms have several very desirable properties, as explained, they have the following disadvantages:

1. It is impracticable to provide ratios which are adjustable except in relatively large steps;

2. It is difficult to provide a pair of windings which are accurately adjusted except in the special case when they are equal;

3. Such ratio arms are not easily applicable to "inverse" bridges that is those in which the standard impedance is proportional to the reciprocal of the unknown impedance.

The principal object of the present invention is to provide a ratio-arm assembly which has properties similar to those of the known types of inductive ratio-arms, but without the above-mentioned disadvantages. The preferred arrangement is analogous to Fig. 2, and is shown in principle in Fig. 3.

In this arrangement, the ratio-arm assembly comprises two impedances 13 and 14, either of which may be resistive, reactive, or complex, corresponding respectively to the inductances 5 and 6. These will be denoted as $Z_1$ and $Z_2$ respectively. Associated with 13 and 14 is a balancing amplifier 15 which is diagrammatically shown, and may take any appropriate form. Only the input grid 16 of the first vacuum tube, and the output anode 17 of the last vacuum tube are indicated, and an earthed cathode 18 representing one or more tube cathodes. It will be understood that all the necessary coupling and supply arrangements, and transformers and the like (not shown) are supposed to be provided in the usual way. The arrangement is such that the impedance 13 is connected in series with the input conductor for the grid 16, and the impedance 14 is connected between the circuit of the anode 17 and the grid 16 in such manner as to feed back a proportion of the output voltage of the amplifier to the input. This feedback circuit should of course be so arranged that Nyquist's rule of stability for the amplifier is satisfied as indicated in the United States Patent No. 1,915,440, issued to Harry Nyquist, June 27, 1933. See also Harry Nyquist, "Regeneration Theory," Bell System Technical Journal, vol. XI, No. 1, January 1932.

The oscillator 10 is connected between corner 2 and ground as shown.

Let $E_1$ be the output voltage of the oscillator 10, and let $E_2$ be the voltage which is produced thereby at corner 4. Let $e_1$ be the voltage applied to the input grid 16. Let $Z_3$ and $Z_4$ be the effective input and output impedances of the amplifier 15 as determined by the feedback.

Supposing that $Z_2$ is disconnected, thus removing the feed back, then $E_2/e_1=-A$, which defines the voltage gain ratio of the amplifier without feedback. A will be assumed to be a positive number, though this is not essential, since A could be complex. Let B be the mutual conductance of the amplifier, without feed back, that is, the ratio of the output current when the amplifier output is short-circuited, to the input voltage producing that current.

It can be shown by methods well known to those skilled in the art, that when $Z_2$ is reconnected, $$E_2E_1=-Z_2/Z_1(1+1/A+Z_2/AZ_1)=-Z_2/Z_1 \quad (1)$$

provided that A is so large that $$1/A \text{ and } Z_2/AZ_1$$

are both negligible in comparison with unity $$Z_3=Z_2/(A+1)=Z_2/A \text{ approximately} \quad (2)$$

and $$Z_4=(Z_1+Z_2)/Z_1B \text{ approximately} \quad (3)$$

In these equations A is the voltage gain ratio which applies under the condition of operation of the amplifier, and in particular depends on the output load. However so long as with the maximum output load the value of A is sufficiently large, as explained, then Equation 1 shows that the ratio $E_2/E_1$ of the voltages applied to corners 4 and 2 of the bridge is determined only by the ratio of $Z_2$ and $Z_1$, and further, Equations 2 and 3 show that both $Z_3$ and $Z_4$ are extremely small. The arrangement is therefore equivalent to a pair of closely coupled inductive ratio arms, but with much greater flexibility since $Z_1$ and $Z_2$ are unrestricted.

In the case of a particular ratio-arm assembly which was constructed, $A=20,000$,
$B=200$ ohms,
$Z_1=30,000$ ohms,
$Z_2=j,30,000$ ohms,
$E_2/E_1=-j$, with an error of less than 0.01%
$Z_3=1.5j$ ohms
$Z_4=0.005(1+j)$ ohms, in which $j=\sqrt{-1}$.

The corner 1 of the bridge will be substantially at ground potential on account of the low input impedance of the balancing amplifier, and since the output impedance is also extremely low, any impedance connecting the corner 4 to ground will be substantially short-circuited, and will not affect the balance. An impedance connecting the corner 2 to ground will also have no effect since it shunts the oscillator 10.

It will be understood that so long as A is sufficiently large it could be a complex quantity provided as already stated, that Nyquist's rule is satisfied.

If $Z_5$ is the value of the impedance 9, then when the bridge is balanced, the value of the unknown impedance $Z_x$ will be given by $$Z_x=Z_5.Z_1/Z_2$$

The impedances Z may take any real or complex form.

Fig. 4 shows an example of the case of a ratio arm assembly according to the invention, in an impedance bridge intended for automatic balancing. The elements which are the same as those shown in Fig. 3 have been given the same designation numbers. The bridge differs slightly from that shown in Fig. 3 in that the detector is not connected directly between the corners 1 and 3, but instead, a current transformer 19 is used, having two primary windings 20 and 21 connected in series respectively with the arms 2—3 and 3—4. The secondary winding 22 is connected to an amplifier 23, the output of which is connected through a transformer 24 to a phase-sensitive detector 25 which will be described later.

The corner 3 is connected to ground, and as already explained, terminal 1 is practically at ground potential owing to the very low effective input impedance of the balancing amplifier 15.

It will often be convenient to give the windings 20 and 21 the same number of turns. They should be wound so that a current $I_2$ flowing towards corner 3 from corner 2 produces a flux which aids the flux produced by a current $I_4$ flowing towards corner 3 from corner 4. The condition for balance is that $$I_2+I_4=0$$

and this will produce zero flux in the transformer core, and therefore no voltage will be applied to the amplifier 23. However, it may be desirable in some circumstances for these currents to be unequal in the balance condition. In this case winding 21 may have $n$ times as many turns as the winding 20, in which case the condition for balance is $$n\ I_2+I_4=0$$

It is understood that $n$ may have any value greater or less than 1. The value of the unknown impedance $Z_x$ is then given by $$Z_x=n\ Z_5.Z_1/Z_2$$

This provides a convenient means for changing the range of the bridge without altering the ranges of $Z_1$, $Z_2$ and $Z_5$. Thus winding 21 could be given a series of tapping points corresponding to $$n=0.1,\ 1,\ 10$$

etc. or the transformer 19 could be changed for another with a different turns ratio, by suitable switching arrangements (not shown).

The balancing amplifier 15 may take any well known form, and a very simple example is given. It consists of two vacuum tubes 26 and 27 coupled by a blocking condenser 28 and grid resistor 29. The cathode of 26 is connected directly to ground, and the cathode of 27 is connected to ground through a conventional bias network consisting of a resistance 30 shunted by a condenser 31. The anode of tube 26 is connected through a resistance 32 to the positive terminal 33 of the high tension supply for the tubes, the negative terminal 34 of which is grounded. The anode of the tube 27 is connected to terminal 33 through the primary winding of the output transformer 35, and one end of the secondary winding is earthed. An adjustable tapping point on this secondary winding is connected to the corner 4 of the bridge. The primary winding of the transformer 35 is tuned to the test frequency by means of a shunt condenser 36. The control grid of the tube 26 is connected directly to the corner 1.

The tubes 26 and 27 have been shown as triodes for simplicity, but other types of tubes such as pentodes may be used, the additional electrodes may be polarised in any conventional way.

The transformer 35 should be so poled that the feedback through the impedance 14 is negative, as conventionally understood.

The oscillator 37 supplies a test wave at a suitable frequency, such as 800 cycles per second, to the primary winding 38 of the transformer 39 having four secondary windings. One of the secondary windings 40 supplies the waves to a phase-changing amplifier 41 which delivers the waves after a phase change of exactly 90°, to the primary winding 42 of a transformer 43. This has three output windings, one of which, 44, has one end connected to ground, and corner 2 is connected to an adjustable tap on this winding. Thus, the output of winding 44 corresponds to the output of the oscillator 10 of Fig. 3.

The phase-changing amplifier 41 may take any suitable known form, and should be designed or adjusted to produce the desired phase change of 90°.

The phase-sensitive detector 25 is of known type and comprises two similar branches supplied by the centre tapped secondary winding of the transformer 24. The elements in the two branches are similar and are distinguished by the letters A and B. Each branch comprises a resistance 45, two similar oppositely directed rectifiers 46 and 47 connected in a bridge network with a centre tapped resistance 48, and an output terminal 49 connected to the junction point of the rectifiers 46 and 47.

A demodulating carrier wave is supplied through the equal output windings 50 and 51 of the transformer 39 or 43, which windings are connected by a rectifier 52. This rectifier is directed oppositely to the other two for currents circulating through the three rectifiers in series, and prevents the windings 50 and 51 from being substantially short-circuited for the phase of the alternating voltage which renders 46 and 47 conducting. The centre taps of the resistances 48A and 48B and of the secondary winding of the transformer 24 are connected to ground. The rectifiers 46, 47 and 52 represent diodes or metal rectifiers, or any other suitable rectifying devices.

In this phase-sensitive detector, a voltage proportional to that component of the bridge unbalance current which is in phase with the oscillator output will be obtained from terminal 49A, and a voltage proportional to the other component will be obtained from terminal 49B. These voltages are respectively applied to control the motors which make the bridge adjustments. Such control may be by any known methods and need not be described in detail in this specification. Fig. 6 to be described later illustrates the arrangement in block schematic form.

The voltages at 49A and 49B may alternatively be applied to suitable voltmeters or other indicating devices in the case of a bridge which is not intended for automatic balancing. Such indicators may be employed when the bridge is manually balanced in the ordinary way.

While in the case of automatic balancing the voltages, at 49A and 49B may be used, as already explained, respectively to control the two motors, it is also possible to employ two different combinations of these two voltages, such as the sum and difference, for respectively controlling the motors.

The amplifier 23 may be of any suitable conventional type, but for a reason to be explained later, it should preferably present a very low impedance (for example 1 ohm) to the winding 22 of the transformer 19. It may therefore be shunted by a resistance 53 of about 1 ohm through a switch 54 when in the position shown. The purpose of this switch will also be explained later.

The amplifier could, however, be designed to have a sufficiently low input impedance without the necessity for adding the resistance 53.

The bridge circuit shown in Fig. 4 is arranged for measuring impedances with negative reactance. The impedance 9 will be a pure resistance ($Z_5$) which may be adjustable in a few relatively large steps for providing various ranges for the bridge. The impedances 14 ($Z_2$) is also an adjustable pure resistance, controlled by one of the motors by any suitable mechanical arrangement. Impedance 13 comprises principally a fixed condenser 55, but associated therewith is an adjustable resistance 56 similarly controlled by the other motor. This is connected between the corner 1 of the bridge and an appropriate tap on a coil 57 of very high inductance connected between corner 2 and ground. To understand how the impedance 13 operates, let it be supposed that the unknown impedance $Z_x$ connected between terminals 7 and 8 is represented by a condenser. The current $I_2$ will be substantially in quadrature with the voltage applied from the winding 44 and if the reactive component is still unbalanced a relatively large control voltage will appear at terminal 49A and will cause the first-mentioned motor to adjust the resistance 14 until this component is balanced. There will however normally be an appreciable conductance component associated with the test condenser which produces a component of the unbalance current which is in phase with the output from the winding 44. This produces corresponding control voltage at terminal 49B which causes the second motor to adjust the variable resistance 56. This resistance feeds a corresponding conductance current to corner 1 which makes the condenser 55 have effectively the same phase angle as the unknown condenser. The inductance 57 reduces the voltage applied to the resistance in a given ratio (which may be changed in suitable steps by moving the tapping point) so that inconveniently large values of the resistance 56 are avoided. It will be understood, however, that the inductance 57 could be omitted and the resistance 56 could be connected directly to the corner 2. This will probably be preferable if the phase angle of the impedance being measured is not very close to 90°. It will thus be seen that when a balance has been finally made, the impedance $Z_1$ will have the same angle as the impedance $Z_x$, and the ratio of the magnitudes $Z_x/Z_1$ is then equal to $Z_5/Z_2$, assuming that $n=1$. If $C_1$ is the capacity of the condenser 55 and $R_1$, the resistance of 56, and $m$ the voltage step-down ratio produced by the coil 57, then the phase angle of $Z_x$ will be $-\tan^{-1} m\omega C_1 R_1$, where $\omega$ is $2\pi$ times the test frequency.

If it is desired to measure an impedance with a positive reactance, then $Z_1$ and $Z_2$ are interchanged, in which case at balance $$Z_x = Z_2 Z_5 / Z_1$$

and the phase angle will be $+\tan^{-1} m\varpi C_1 R_1$.

If it is desired to measure a substantially pure resistance, the impedance 13 is replaced by a fixed resistance (not shown) connected directly between corners 1 and 2, the elements 55, 56 and 57 being omitted. While theoretically a balance could be made by adjusting the resistance 14 alone, in practice there will usually be a very small reactive component which should be balanced out if a satisfactory adjustment of the resistance 14 is to be made. This component is usually not of any interest, and in any case would be difficult to measure with any accuracy. To balance it out therefore, the transformer 39 is furnished with an output winding 58 with a grounded centre tap, and shunted by a potentiometer 59. The contact of this potentiometer is connected to the spare contact of the switch 54. This switch will be operated to the spare contact when measuring a resistance, and the effect will be to supply to the output of the amplifier 23 a small quadrature current which may be adjusted by means of the potentiometer 59 to balance out the quadrature component of the unbalance current. The potentiometer 59 may be driven by the second motor which also drives the resistance 56, which will of course be disconnected when a resistance is being measured.

The principal reason for choosing a very low impedance for the input circuit of the amplifier 23 is that by transformer action the impedance effectively connected between terminal 8 and corner 3 of the bridge is also very small, so that the error produced by a ground admittance connected to terminal 8 will be negligible. Thus, for example, if windings 20, 21 and 22 have equal numbers of turns, and the resistance 53 is ohm, then effectively 1 ohm will be connected between corner 3 and terminal 8 or resistance 9. The transformer 19 being used in such a low impedance circuit can therefore be very small and cheap.

However, if the unknown impedance has one terminal directly connected to ground, it is necessary to make a slight alteration in the arrangements. In this case the winding 20 and the unknown impedance are interchanged, the grounded terminal of the unknown impedance being connected to corner 3. It is however necessary in this case to screen the winding 20 in such manner as to prevent any admittance acting across the unknown impedance. The manner in which this may be done is shown in Fig. 5, which shows a modification of the upper part of the bridge shown in Fig. 4. The winding 20 of the transformer 19 is surrounded by an inner shield 60 which screens it from windings 21 and 22 and from the outer shield 61 which is connected permanently to ground. An additional pair of terminals 62 and 63 for the unknown impedance are connected respectively to the winding 20 and to the corner 3. Terminals 7 and 8 will be short-circuited as indicated. A switch 64 in the position shown connects the inner screen 60 to corner 2 through terminals 7 and 8.

It will be seen that the admittance between the two screens acts effectively to ground from corner 2, and, therefore has no effect in the balance for the reason already explained. It it is desired to revert to the arrangement of Fig. 3, the short-circuit between terminals 7 and 8 is removed, and terminals 62 and 63 are short-circuited instead, and the switch 64 is operated to the other position, thus connecting the inner screen 60 to ground.

It should be noted that the outer screen 61 should have partitions such as 65 and 66 which screen the inner screen 60 from the windings 21 and 22, otherwise undersired admittances will act across from corner 2 to these windings when the switch is in the position shown.

Referring again to Fig. 4, the transformer 19 may be modified by omitting one of the primary windings, for example, 21. This modification is shown in Fig. 4a, and the impedance 9 is in this case connected to the terminal of the other primary winding 20 which is connected to terminal 8. This arrangement is electrically equivalent to that shown in Fig. 4, but the transformer is now outside the bridge network, and it becomes possible to connect the resistance 53 across the remaining primary winding 20 instead of across the secondary winding 22. This winding may then be designed to step up to the input impedance of the amplifier 23, which can be given any convenient value.

If it is desired to employ unequal currents in the two arms of the bridge, one or more intermediate taps may be provided on the primary winding 20 (one end of which is connected to ground) as shown in Fig. 4a and the impedance 9 and the terminal 8 may be respectively connected to different taps, the end of the winding being considered as a tap. In Fig. 4a the connecnection of impedance 9 to a tap on winding 20 is indicated by a dotted line. The winding 20 then acts as an auto-transformer, and produces an arrangement which is electrically equivalent to the Fig. 4 arrangement when the two primary windings have unequal numbers of turns. When a single primary winding is used with one or more taps, the resistance 53 could be connected across that part of the winding which is outside the bridge.

Fig. 6 indicates diagrammatically the manner in which the variable elements of the bridge of Fig. 4 may be automatically adjusted. The motor 67 which drives the movable contact of the resistance 14, is operated from control apparatus 68 in accordance with the control voltage produced at terminal 49B of the phase-sensitive detector 25 shown in Fig. 4. The speed and direction of rotation of the motor are controlled by any suitable known circuits in the apparatus 68 in such manner as to adjust the resistance 14 so as to reduce the bridge unbalance until the control voltage is reduced substantially to zero, when the motor is stopped. In like manner, the second motor 69 is operated from similar control apparatus 70 in accordance with the control voltage produced at terminal 49A, and similarly adjusts the resistances 56 and 59 which are both geared to the motor shaft. As already explained only one of these resistances will be in circuit at any one time, 56 being used when measuring reactive impedances, and 59 when a pure resistance is being measured.

In automatic balancing, it is important that the adjustment for the resistive and reactive components of the unknown impedance should be substantialy independent of one another, and also that the out-of-balance ratio, that is the ratio of the unbalance current or voltage to the impedance unbalance should be substantially constant. The first condition is fulfilled by suitable choice of the type of bridge network to be used, and the other is fulfilled by the use of the current transformer 19. It is to be noted that because the impedance included by this transformer in the bridge network is so small, the impedance common to the currents $I_2$ and $I_4$ (Fig. 4) is very small, and they are therefore substantially independent of one another.

Figure 3:
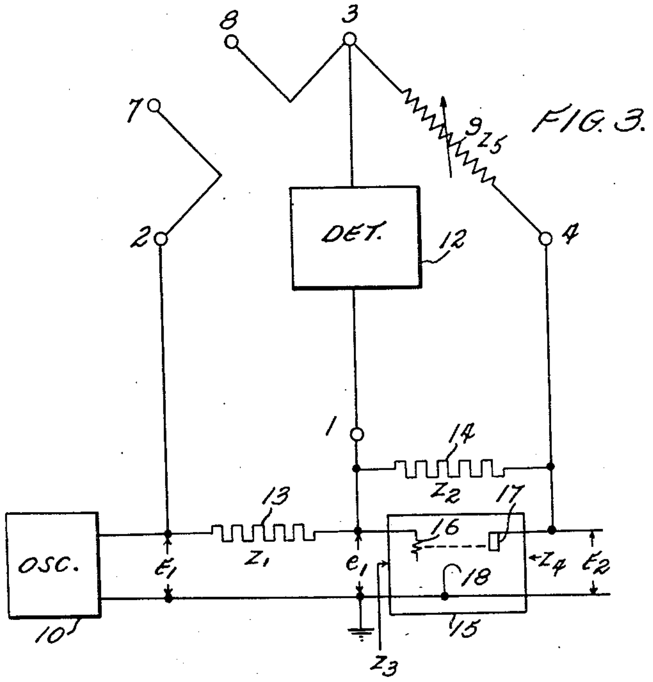
Fig. 3 shows a schematic circuit diagram of a bridge network employing a ratio-arm assembly according to the invention which has properties similar to those of the network of Figs. 1 and 2.

It will be, of course, understood that other types of bridge network than the one shown in Fig. 4 would fulfill the first-mentioned condition. It is also not essential that either condition should be fulfilled, since the ratio-arm assembly which has been described may be used in any type of bridge not necessarily used for automatic balancing, and such a bridge could be arranged as shown in Fig. 3, without the use of a current transformer.

Having now particularly described and ascertained the nature of our said invention and in what manner the same is to be performed, we declare that what we claim is:

1. An electric impedance bridge comprising first and second impedances respectively occupying adjacent arms of the bridge, a balancing amplifier having a feedback path including one of the said impedances, a third impedance occupying a third arm of the bridge, means for connecting an unknown impedance in the fourth arm thereof, said amplifier having an input and an output circuit, the junction point of the first and second impedances being connected to said input circuit of the amplifier, said output circuit being connected to the other end of said second impedance, an oscillator for supplying alternating voltage at a given frequency to said bridge, said oscillator being adapted to apply said alternating voltage between the other end of said first impedance and the common grounded conductor of the input and output circuits of the amplifier, means connected to the bridge for detecting the unbalance current or voltage produced by the bridge and means for supplying directly to the detecting means an adjustable current in quadrature with the voltage supplied by the oscillator to the bridge.

2. An impedance bridge according to claim 1 in which one of the said first and second impedances comprises an adjustable pure resistance and the other comprises a fixed reactive portion and an adjustable reactive portion.

3. An impedance bridge according to claim 2 comprising a current transformer having a primary winding connected between ground and the junction point of the said third and fourth arms, and a secondary winding connected to the detecting means.

4. An impedance bridge according to claim 1 comprising a current transformer having a secondary winding connected to the detecting means, and a tapped primary winding having one end connected to ground, said third impedance and said unknown impedance being connected respectively to different taps thereon.

5. An impedance bridge according to claim 4 in which a resistance of value small compared with any of the impedances connected in the bridge arms is connected across that part of the primary winding which is outside the bridge.

6. An impedance bridge according to claim 2 comprising a current transformer having two primary windings connected respectively in series with the third and fourth arms of the bridge and a secondary winding connected to the detecting means, the junction point of the said third and fourth arms being connected to ground.

7. An impedance bridge according to claim 6 in which the said detecting means has an input impedance very small compared with any of the impedances connected in the bridge arms.

8. An impedance bridge according to claim 7 in which the two primary windings of the current transformer each has one terminal connected to the junction point of the third and fourth arms of the bridge.

9. An impedance bridge according to claim 7 in which one of the primary windings of the current transformer has one terminal connected to to the junction point of the third and fourth arms of the bridge and in which the other primary winding has one terminal connected to the junction point of the fourth arm and said other end of said first impedance.

10. An impedance bridge according to claim 9 in which the said current transformer has a main grounded screen surrounding all the windings and an inner screen surrounding the said other winding alone and screening it from both the ground screen and from the remaining windings, the said inner screen being connected to the junction point of the fourth arm and said other end of said first impedance.

11. An impedance bridge according to claim 10 in which the said detecting means comprises an amplifier followed by a detector adapted to derive from the bridge a control voltage proportional to the impedance unbalance of the bridge.

12. An impedance bridge according to claim 11 adapted for automatic balancing, in which the detecting means comprises means for separately deriving from the bridge two control voltages proportional respectively in the in-phase and quadrature components of the said unbalance current or voltage.

13. An impedance bridge according to claim 12 in which the oscillator is adapted to provide two sets of alternating voltage waves differing in phase by 90°, one set being applied to the bridge and both sets to the detecting means.

14. An impedance bridge according to claim 13 in which the said control voltages are respectively applied to control the operation of two adjusting electric motors each of which is adapted to adjust the balance of the bridge in respect of a corresponding one of the two quadrature components of the unknown impedance.

15. An electric impedance bridge comprising first and second impedances respectively forming first and second adjacent arms of the bridge, a balancing amplifier having a feed-back path including one of said impedances and having an input and an output circuit, a third impedance forming a third arm of said bridge, means for connecting an unknown impedance in the fourth arm of said bridge, means connecting the junction point of the first and second impedances to said input circuit, said output circuit being connected to the other end of said second impedance, an oscillator for supplying alternating voltage at a given frequency to said bridge, said oscillator being connected between the other end of said first impedance and said input circuit and means connected to said bridge for detecting the unbalanced current or voltage produced by said bridge.

16. An electric impedance bridge comprising first and second impedances respectively forming first and second adjacent arms of the bridge, a balancing amplifier having a feed-back path including one of said impedances and having an input and an output circuit, a third impedance forming a third arm of said bridge, means for connecting an unknown impedance in the fourth arm of said bridge, means connecting the junction point of the first and second impedances to a first point in said input circuit, said output circuit being connected to the junction point of said second and third impedances, an oscillator for supplying alternating voltage at a given frequency to said bridge, said oscillator being connected between the junction point of said first impedance and said fourth arm and a second point in said input circuit and means connected to the junction point of said third impedance and said fourth arm for detecting the unbalanced current or voltage produced by said bridge.

NORMAN FRANK MOODY.
DONALD MURDO McCALLUM.

REFERENCES CITED

The following references are of record in the file of this patent:

UNITED STATES PATENTS

| Number | Name | Date |
| --- | --- | --- |
| 1,660,405 | Affel | Feb. 28, 1928 |
| 1,665,397 | Wunsch | Apr. 10, 1928 |
| 2,008,855 | Drobish | July 23, 1935 |
| 2,195,439 | Wilson | Apr. 2, 1940 |
| 2,393,669 | Wheaton et al. | Jan. 29, 1946 |